United States Patent [19]

Kinney

[11] 3,861,739

[45] Jan. 21, 1975

[54] DOOR FOR CLOSING EMERGENCY EXIT OPENING FOR A BUS

[76] Inventor: Ronald L. Kinney, 1352 N. Salaveras, Fresno, Calif. 93728

[22] Filed: Oct. 1, 1973

[21] Appl. No.: 402,396

[52] U.S. Cl. .................... 296/146, 296/51, 214/85, 49/141, 49/192
[51] Int. Cl. ............................................... B60j 5/04
[58] Field of Search ................. 296/50, 51, 61, 146; 214/85, 85.1; 49/37, 141, 192

[56] References Cited
UNITED STATES PATENTS

| 420,605 | 2/1890 | McCauley | 214/85 |
|---|---|---|---|
| 1,528,090 | 3/1925 | Tracy | 296/61 |
| 1,639,879 | 8/1927 | Buffington | 296/61 |
| 1,660,377 | 2/1928 | Fitzjohn | 296/146 |
| 3,387,406 | 6/1968 | Coker et al. | 296/50 |

FOREIGN PATENTS OR APPLICATIONS

| 639,021 | 5/1962 | Italy | 296/50 |

Primary Examiner—M. Henson Wood, Jr.
Assistant Examiner—Robert Saifer
Attorney, Agent, or Firm—Huebner & Worrel

[57] ABSTRACT

An improved door for closing an emergency exit opening for a bus. The door is characterized by a door panel having a predetermined load supporting capability and configured to be received in a closed position within an exit opening, a first hinge supporting the door panel for pivotal displacement from the closed position, through an angle substantially greater than 90° about an axis normally related to the longitudinal axis of the bus, whereby the panel is employable as a simple closure member, a second hinge supporting the panel for displacement from the closed position, through an angle substantially greater then 90° about a second axis paralleling the longitudinal axis of the bus, whereby the panel is positioned for use as an exit ramp, and a selectively operable latch for releasing the door panel for alternative rotation about the first and second axes.

2 Claims, 5 Drawing Figures

PATENTED JAN 21 1975  3,861,739
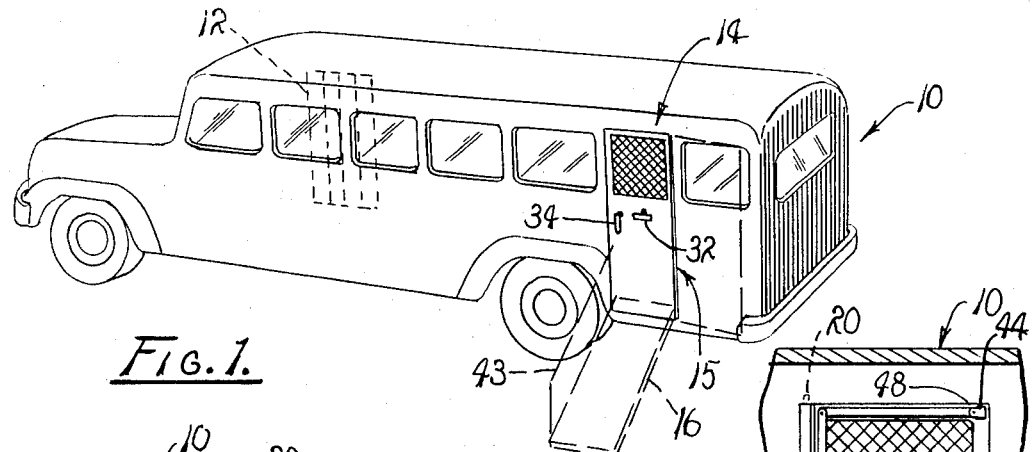
FIG. 1.
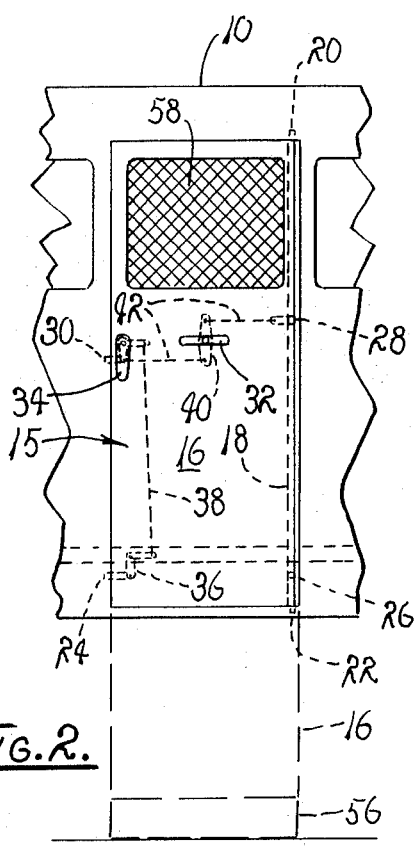
FIG. 2.
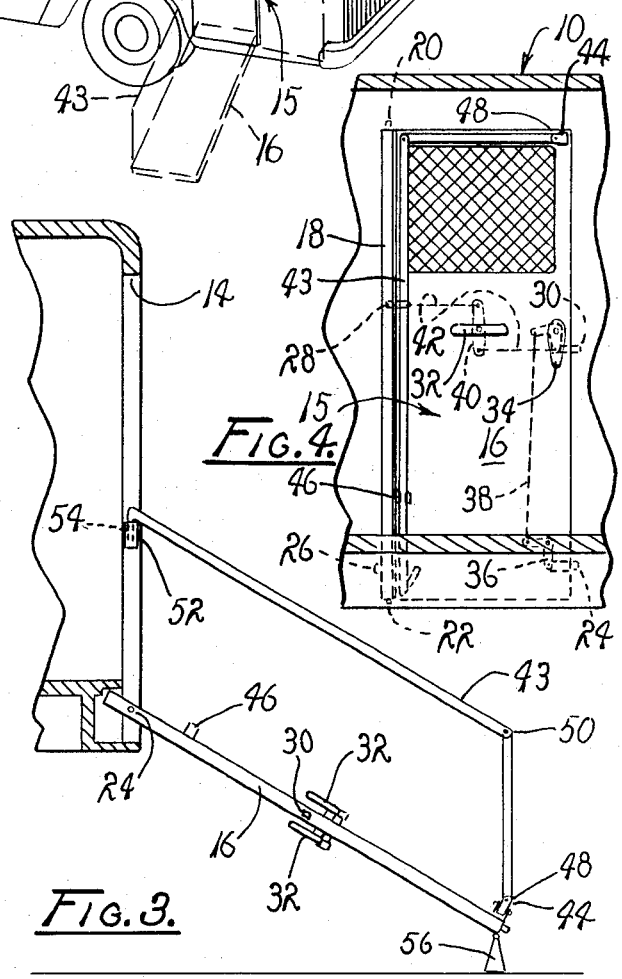
FIG. 3.
FIG. 4.
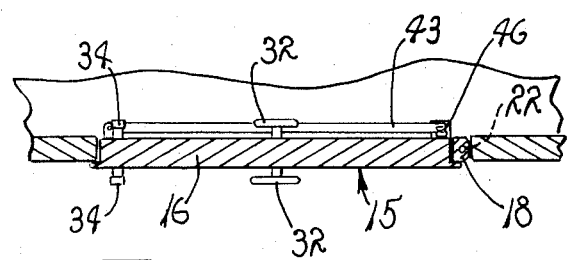
FIG. 5.

3,861,739

DOOR FOR CLOSING EMERGENCY EXIT OPENING FOR A BUS

BACKGROUND OF THE INVENTION

The invention generally relates to doors for closing emergency exit openings in vehicles, and more particularly to an improved door supported for alternative rotation about orthogonally related axes, whereby egress through emergency exits provided for school buses and the like is facilitated.

As is well understood by those familiar with passenger vehicles, such as buses employed in delivering children, hereinafter referred to as school buses, access to the passenger compartment is facilitated through pivotal doors located adjacent the position normally assumed by a driver within the forwardmost portion of the body of the bus. Unfortunately, in an event of an accident, these doors frequently become jambed, particularly in instances where impact is sustained in the vicinity of the doors. Equally unfortunate, when damage is sustained to the forward portion of the body, the driver often is incapacitated. As a consequence, the passengers are required to exit the bus on their own initiative.

This problem becomes particularly critical when the bus is employed in transporting small and inexperienced children. The criticality of the problem is exemplified by instances where a school bus is involved in an accident and sustains damage to the doors normally employed in gaining access to the passenger compartment, and/or the bus is caused to roll over on its side. In either event, egress through the doors is difficult and, in some instances, even impossible. Consequently, small children are required to exit through emergency exit openings provided in the body of the bus. Of course, the children necessarily are left to their own devices in the event the driver sustains incapacitating injury. Where the children are quite small, a use of emergency exits is frequently impractical, since the exits normally are located at substantial elevations above the ground so that small children simply cannot jump or climb to the ground without risking injury. This risk is increased in situations where injury has been sustained and/or a state of panic exists. Moreover, emergency exit openings usually are closed by closure panels so constructed that small children can readily remove them. The lack of adequate facilities heretofore described, coupled with the ever-present threat of fire, presents a practically intolerable condition under which large numbers of children currently are transported.

It should therefore readily be apparent that emergency exits provided in school buses and the like simply have not met existing needs and, as a result, there exists a heretofore unsolved problem of significant proportions.

It is, therefore, the general purpose of the instant invention to provide improved doors for closing emergency exit openings for passenger compartments of vehicles, such as those employed with school buses and the like, which serve to provide a practical solution to the problems heretofore discussed.

OBJECTS AND SUMMARY OF THE INVENTION

It is an object of the instant invention to provide an improved door for closing an emergency exit opening for the passenger compartment of a bus.

Another object is to provide in combination with a school bus an improved door including a closure panel and a plurality of hinges supporting the door panel for rotation about orthogonally related axes, whereby the door is selectively employable as a simple closure panel or as an exit ramp.

It is another object to provide an improved door for closing an emergency exit of a school bus including a door panel supported for rotation about a first axis, wherein the moment arm for the door is minimized, and a second axis wherein the door panel may be lowered to the ground from an upright bus and employed as an exit ramp for thereby facilitating egress from the bus.

It is another object to provide an improved door for closing an emergency exit opening for a school bus which can be readily pivoted about a first axis normally related to the longitudinal axis of the bus, when the bus is on its side, whereby minimal force is required in rotating the door panel out of the exit opening, and about a second axis when the bus is upright, whereby the door panel can be lowered into engagement with the ground and employed as an exit ramp for small children.

These and other objects and advantages are achieved through the use of a door panel for closing an emergency exit opening in a school bus, adapted to be rotated through an angle greater than 90° about an axis normally related to the longitudinal axis of the bus and, alternatively rotated through an angle greater than 90° about an axis paralleling the longitudinal axis of the bus, whereby the door panel is disposed in a ramp configuration, as will hereinafter become more readily apparent by reference to the following description and claims in light of the accompanying drawings.

BRIEF DESCRIPTION OF THE DRAWINGS

FIG. 1 is a perspective view of a school bus having an enclosure defining a passenger compartment including an emergency exit and an improved door which embodies the principles of the instant invention for closing the emergency exit.

FIG. 2 is a fragmented, external view illustrating the improved door, on an enlarged scale, disposed in a closed configuration.

FIG. 3 is a fragmented, cross-sectional view illustrating the improved door disposed in a ramp configuration.

FIG. 4 is a fragmented, internal view of the improved door disposed in a closed configuration.

FIG. 5 is a fragmented, partially sectioned, top plan view of the improved door shown in FIGS. 1 through 4.

DESCRIPTION OF THE PREFERRED EMBODIMENT

Referring now to the drawings wherein like reference characters designate like or corresponding parts throughout the several views, there is shown in FIG. 1 a school bus, generally designated 10.

The bus 10 includes pivotal doors 12 located in the vicinity in the forward portion of the bus and an emergency exit opening 14 located rearwardly of the doors 12, in spaced relation therewith. As a practical matter, the emergency exit opening 14 normally is located at the side of the bus opposite the doors 12, as illustrated in FIG. 1. As shown, the opening 14 is closed by an improved door assembly 15 which embodies the principles of the instant invention.

It is to be understood that the door assembly 15, where desired, is provided in "kit" form and configured to be received within openings defining emergency exits for passenger compartments of school buses and the like currently in use. However, the improved door assembly 15 preferably is included, during fabrication, within the enclosures employed as bodies for buses. In any event, it will be appreciated that the door assembly 15 is appropriately dimensioned to be received within openings provided as emergency exits.

It is particularly important to note here that the door assembly 15 includes a door panel 16 supported by a hinge plate 18 for rotation from a closed configuration, FIG. 1, about an axis orthogonally related to the longitudinal axis of the bus. The hinge plate 18 is set into the opening 14 and includes a pair of oppositely projected vertical pins 20 and 22. These pins are received within suitable journals set into the body of the bus, adjacent the opening 14, and accommodate a rotation of the plate 18 about a vertical axis passing through the pins. It will, of course, be appreciated that while the pins 20 and 22 are positioned, as shown, to accommodate an opening of the door panel in a rearward direction, the pins 20 and 22 may be so positioned, where desired, as to facilitate an opening of the door panel in a forward direction. The door panel 16 is, in turn, provided with a pair of hinge pins, designated 24 and 26, which are located near the bottom of the panel 16 and support the panel for rotation about an axis passing through the pins in parallelism with the longitudinal axis of the bus 10.

The pin 24 preferably is configured as an axially displaceable bolt, the end of which is received within a suitable journal, not designated, set into the body of the bus in coaxial alignment with the pin 24, when the door panel 16 is in a closed configuration. The pin 26 is configured as a suitable hinge pin affixed to and projected from the plate 18 and received within a journal, not designated, set into the door panel 16.

As shown, the door panel 16 is further connected to the plate 18 through a spring-loaded, axially displaceable bolt 28 which seats within a suitable catch, not designated, provided in the plate 18. Thus, it should be apparent that the door panel 16 is connected with a hinge plate 18 through the pin 26 and the bolt 28, whereby rotation of the door panel 16 along with the hinge plate 18, about the pins 20 and 22 from a closed configuration to a simple open configuration, FIG. 1, is facilitated. Moreover, it is to be understood that the door panel 16 is supported by the hinge pins 24 and 26 for rotation from a closed configuration about an axis passing therethrough and paralleling the longitudinal axis of the body of the bus 10 to a ramp configuration, FIG. 3.

It is to be understood that the plate 18 and the hinge pins 20 through 26, as described, are merely illustrative of mechanisms which are employed for imparting to the door panel 16 a capability for rotation about each axis of a pair of orthogonally related axes so that the door panel may be pivotally opened to a simple open configuration or, alternatively, to a ramp configuration. Of course, other means can be employed equally as well. Therefore, the door assembly 15 is, where desired, provided with other suitable hinge structures which impart to the door panel 16 a capability of alternative rotation about both a vertical and a horizontal axis, to an extent required, for performing desired functions, aforedescribed.

The door panel 16 is further connected with the body of the bus 10, when the door panel is in a closed configuration, through a spring-loaded bolt 30 seated in a suitable catch, not designated, provided in the adjacent surface of the body of the bus. Therefore, in order to release the door panel 16 for rotation about the axis passing through the hinge pins 20 and 22, the hinge pin 24 and the bolt 30 are simultaneously retracted. Similarly, in order to release the door panel 16 for rotation about the axis passing through the hinge pins 24 and 26, the bolts 28 and 30 simultaneously are retracted.

To achieve a retraction of the pin 24 and bolt 30, and, alternatively, a retraction of the bolts 28 and 30, a pair of suitable handles, designated 32 and 34, are provided. These handles are provided at both sides of the door panel so that access from both outside the body of the bus, as well as from inside the body of the bus, is facilitated. Preferably, the handles, similarly configured, are mounted on pins, not designated, extended through the door panel. Moreover, the handles 32 and 34 are mounted at a level, within the body of the bus, which accommodates a grasping thereof, even by small children.

The hinge pin 24 is connected to the handle 34 through a suitable bellcrank 36 and a connecting linkage designated 38. Consequently, rotation imparted to the handle 34 serves to impart concurrent rotation to the bellcrank 36, whereupon the hinge pin 24 is responsively retracted from the journal within which it is seated, as the bolt 30 simultaneously is retracted from the catch within which it is seated.

Similarly, the handle 32 is connected with a bellcrank arm 40 which is, in turn, connected through a connecting linkage 42 to both the bolts 28 and 30. Hence, rotation of the handle 32 serves to effect a retraction of the bolts 28 and 30 from their respective catches for thus releasing the door panel 16 for rotation about an axis passing through the hinge pins 24 and 26.

As illustrated in FIG. 3, there is mounted upon the door panel 16 a hand rail 43. The hand rail 43 is provided for assisting passengers, particularly small children, in exiting the emergency opening 14 employing the door panel 16 in its ramp configuration. As shown in FIG. 4, the hand rail 43 normally is stowed against the face of the door panel 16. In order to facilitate stowage of the hand rail, there is provided on the face of the door panel, in diametric opposition, a clevis 44 and a spring catch 46. The clevis 44 connects one end of the hand rail 43 to the door panel 16, near one corner thereof, while the spring catch 46 serves to receive and releasibly secure the distal portion of the hand rail in place against the surface of the door panel.

The hand rail 43 also includes a pair of pivotal joints 48 and 50 which accommodate manipulation as the hand rail is erected to its operative configuration, illustrated in FIG. 3. As a practical matter, an eye 52 is affixed to the wall of the body of the bus, illustrated in FIG. 2, and receives therein a pin 54 projected from the distal end of the hand rail 43. Where desired, the clevis 44 is provided with a spring-loaded catch, not shown, of a conventional design, for imparting rigidity to the hand rail once it is erected.

Thus, it should readily be apparent that when the door panel 16 is in its ramp configuration, an erection of the hand rail 43 readily is effected simply by lifting the hand rail from the spring catch 46 and thereafter depositing the pin 54 in the eye 52. Of course, it is to be understood that erection of the hand rail 43, by even small children, readily is achieved.

In some instances, it is desirable to reduce the angle of inclination of the door panel 16, when it is disposed in its ramp configuration, without increasing the overall length dimension thereof. To achieve this, a bumper 56, formed of any suitable material, is affixed to the external surface of the door panel 16, near its uppermost end, so that the panel is afforded support thereby as it comes to rest in its downwardly inclined, ramp configuration.

OPERATION

It is believed that in view of the foregoing description, the operation of the device will readily be understood and it will be briefly reviewed at this point.

With the door assembly 15 mounted in the manner hereinbefore described, and the door panel 16 disposed in a closed configuration, the panel is readied to be released for rotation about an axis passing through the hinge pins 20 and 22, as well as about an axis passing through the pins 24 and 26.

By manipulating the handle 34, the bolt 30 is retracted from its catch as the hinge pin 24 is retracted from the journal within which it is seated. Thus, the door panel 16 is released for rotation about the axis passing through the pins 20 and 22, along with the hinge plate 18. As can readily be appreciated, should the bus be laying on its side, with the opening 14 facing upwardly, the door panel 16 can readily be lifted, from inside the bus, even by small children, due to the shortness of the moment arm acting about the axis of rotation.

In the event the bus is upright, as illustrated in FIG. 1, the door panel 16 is released for rotation about the axis passing through the hinge pins 24 and 26, simply by rotating the handle 32 for simultaneously retracting the bolts 28 and 30 from their catches. Thus, the door panel 16 is released for rotation. Rotation of the panel through an angle greater than 90° causes the panel to assume an inclined, ramp configuration, illustrated in FIG. 3, as it comes to rest on the bumper 56. A passenger now lifts the hand rail 43 from the catch 46 and secures the pin 54 within the eye 52, for thus providing a hand rail for assisting other passengers as they walk down the ramp formed by the inclined door panel.

Thus, an exit of passengers to ground level is accommodated, without subjecting the passenger to possible injuries due to jumping, falling, and the like.

In view of the foregoing, it should readily be apparent that the improved door of the instant invention provides a practical solution to the perplexing problem of accommodating an exit of small children from school buses and the like in the event the bus sustains damage through accident.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In combination with a bus having an elongated body including means defining an elongated passenger compartment, a door opening located near the forward end of said compartment for facilitating passenger ingress and egress, and at least one emergency exit opening located near the other end of said compartment through which passenger egress is facilitated, in the event egress through said door opening is impaired, a panel of a unitary configuration having a length sufficient to extend from said emergency exit opening into supported engagement with the supporting surface for said bus at an angle of inclination suitable for facilitating ambulatory egress from said emergency opening disposed within the emergency exit opening, means supporting said panel for pivotal rotation from said emergency exit opening about a first axis paralleling the longitudinal axis of said body into engagement with a supporting surface for said bus when the bus is oriented in an upright plane, means supporting said panel for pivotal rotation from said emergency exit opening about a second axis normally related to said first axis for facilitating a pivotal removal of said panel from said emergency exit opening when the vehicle is oriented in a plane angularly related to said upright plane, and means for releasing said panel from within said compartment for pivotal rotation from said emergency exit opening.

2. The improvement of claim 1 further comprising a hand rail affixed to said door panel and means for supporting said hand rail in a plane normally related to the plane of said door panel.

* * * * *

UNITED STATES PATENT OFFICE
CERTIFICATE OF CORRECTION

Patent No. 3,861,739          Dated January 21, 1975

Inventor(s) Ronald L. Kinney

It is certified that error appears in the above-identified patent and that said Letters Patent are hereby corrected as shown below:

[76]  Inventor:  Ronald L. Kinney, 1352 N.

delete "Salaveras" and insert

---Calaveras---, Fresno, Calif. 93728

Signed and sealed this 18th day of March 1975.

(SEAL)
Attest:

RUTH C. MASON
Attesting Officer

C. MARSHALL DANN
Commissioner of Patents
and Trademarks